United States Patent
Imura

(10) Patent No.: US 12,110,968 B2
(45) Date of Patent: Oct. 8, 2024

(54) SLIDING COMPONENT

(71) Applicant: EAGLE INDUSTRY CO., LTD., Tokyo (JP)

(72) Inventor: Tadatsugu Imura, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/908,515

(22) PCT Filed: Mar. 2, 2021

(86) PCT No.: PCT/JP2021/007813
§ 371 (c)(1),
(2) Date: Aug. 31, 2022

(87) PCT Pub. No.: WO2021/182168
PCT Pub. Date: Sep. 16, 2021

(65) Prior Publication Data
US 2023/0118633 A1     Apr. 20, 2023

(30) Foreign Application Priority Data
Mar. 9, 2020  (JP) ................................ 2020-040352

(51) Int. Cl.
*F16J 15/34*   (2006.01)
(52) U.S. Cl.
CPC ................................ *F16J 15/3416* (2013.01)
(58) Field of Classification Search
CPC ...... F16J 15/34; F16J 15/3404; F16J 15/3408; F16J 15/3412; F16J 15/3416
See application file for complete search history.

(56) References Cited

U.S. PATENT DOCUMENTS

| 6,152,452 A | 11/2000 | Wang | 277/400 |
| 9,353,867 B2 | 5/2016 | Itadani et al. | F16J 15/3448 |
| 2013/0209011 A1 | 8/2013 | Tokunaga | F16J 32/0633 |

(Continued)

FOREIGN PATENT DOCUMENTS

| EP | 0672852 | 9/1995 | F16J 15/34 |
| EP | 3284981 | 2/2018 | F16J 15/34 |

(Continued)

OTHER PUBLICATIONS

International Preliminary Report on Patentability issued in PCT/JP2021/007813, dated Sep. 6, 2022, 6 pages.

(Continued)

*Primary Examiner* — Gilbert Y Lee
(74) *Attorney, Agent, or Firm* — HAYES SOLOWAY P.C.

(57) ABSTRACT

Provided is a sliding component capable of reliably generating a negative pressure in a shallow groove regardless of a relative rotation speed of the other sliding component. In an annular sliding component disposed at a relatively rotating position of a rotating machine and sliding relative to the other sliding component, a sliding surface of the sliding component is provided with a shallow groove extending in a circumferential direction and generating a negative pressure and a deep groove collecting a sealing target fluid in the shallow groove and deeper than the shallow groove. The shallow groove has a terminating end portion in which a cross-sectional are of a flow path thereof becomes narrow toward the deep groove.

18 Claims, 12 Drawing Sheets

(56) References Cited

U.S. PATENT DOCUMENTS

| | | | | |
|---|---|---|---|---|
| 2014/0197600 | A1 | 7/2014 | Hosoe et al. | F16J 15/40 |
| 2015/0377360 | A1 | 12/2015 | Itadani et al. | F16J 15/3488 |
| 2017/0002930 | A1 | 1/2017 | Itadani et al. | F16J 15/3412 |
| 2017/0102074 | A1 | 4/2017 | Itadani et al. | F16J 15/34 |
| 2021/0080009 | A1* | 3/2021 | Kimura | F16J 15/3412 |
| 2022/0099188 | A1 | 3/2022 | Imura et al. | F16J 15/3412 |
| 2022/0106980 | A1 | 4/2022 | Imura et al. | F16C 17/026 |
| 2022/0120315 | A1 | 4/2022 | Ou | F16C 17/045 |
| 2022/0128088 | A1* | 4/2022 | Suzuki | F16C 33/107 |
| 2022/0145992 | A1* | 5/2022 | Miyazaki | F16C 33/107 |

FOREIGN PATENT DOCUMENTS

| | | | | |
|---|---|---|---|---|
| EP | 3680519 | | 7/2020 | F16J 15/34 |
| EP | 3889474 | | 10/2021 | F16J 15/34 |
| EP | 3922876 | | 12/2021 | F16J 17/04 |
| EP | 4177488 | | 5/2023 | F16C 17/04 |
| EP | 4177500 | | 5/2023 | F16J 15/16 |
| JP | S59231268 | | 12/1984 | F16J 15/34 |
| JP | S59231269 | | 12/1984 | F16J 15/34 |
| JP | S6231775 | | 2/1987 | F16J 15/34 |
| JP | 2020173020 | | 10/2020 | F16J 15/34 |
| WO | 2012046749 | | 4/2012 | F16J 15/34 |
| WO | 2013035502 | | 3/2013 | F16J 15/34 |
| WO | 2014148317 | | 9/2014 | F16J 15/34 |
| WO | 2015087800 | | 6/2015 | F16J 15/34 |
| WO | 2015199172 | | 12/2015 | F16J 15/34 |
| WO | 2016167262 | | 10/2016 | F16J 15/34 |
| WO | 2019049847 | | 3/2019 | F16J 15/34 |
| WO | WO2019221226 | | 11/2019 | F16J 15/18 |
| WO | WO-2019221226 | A1* | 11/2019 | F16J 15/3412 |
| WO | 2020162348 | | 8/2020 | F16C 17/04 |
| WO | 2020162349 | | 8/2020 | F16C 17/04 |
| WO | 2020166589 | | 8/2020 | F16C 17/04 |

OTHER PUBLICATIONS

International Search Report and Written Opinion issued in PCT/JP2021/007813, dated May 18, 2021, with English translation, 15 pages.

International Preliminary Report on Patentability issued in PCT/JP2021/012316, dated Sep. 22, 2022, 6 pages.

International Search Report and Written Opinion issued in PCT/JP2021/012316, dated Jun. 8, 2021, with English translation, 15 pages.

International Preliminary Report on Patentability issued in PCT/JP2021/014347, dated Oct. 25, 2022, 4 pages.

International Search Report and Written Opinion issued in PCT/JP2021/014347, dated Jun. 8, 2021, with English translation, 11 pages.

U.S. Appl. No. 17/913,154, filed Sep. 20, 2022, Imura.

U.S. Appl. No. 17/920,009, filed Oct. 19, 2022, Negishi et al.

European Search Report issued in related application serial No. 21767086.8, dated Mar. 27, 2024, 10 pages.

European Search Report issued in related application serial No. 201793420.7, dated Apr. 22, 2024, 8 pages.

European Search Report issued in related application serial No. 21793420.7, dated Apr. 22, 2024, 8 pages.

\* cited by examiner

SLIDING COMPONENT

TECHNICAL FIELD

The present invention relates to sliding components that rotate relative to each other and are used for, for example, a shaft sealing device shaft-sealing a rotary shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents a leakage of a sealing target fluid, for example, a mechanical seal includes a pair of annular sliding components rotating relative to each other so that sliding surfaces slide on each other. In such a mechanical seal, there has been a recent demand to reduce the energy lost caused by sliding for environmental measures and the like. Here, for example, a sliding surface of a sliding component is provided with a positive pressure generation groove which communicates with an outer radial side corresponding to a high-pressure sealing target fluid side and of which one end is closed by the sliding surface. Accordingly, since a positive pressure is generated in the positive pressure generation groove so that the sliding surfaces are separated from each other and the sealing target fluid is introduced into the positive pressure generation groove from the outer radial side so that the sealing target fluid is held therein during the relative rotation of the sliding component, lubricity is improved and low friction is realized.

Further, the mechanical seal is required to have "sealing" in addition to "lubrication" in order to maintain sealing performance for a long period of time. For example, in a mechanical seal shown in Patent Citation 1, one sliding component is provided with a Rayleigh step and a reverse Rayleigh step communicating with a sealing target fluid side. Accordingly, a positive pressure is generated between sliding surfaces due to the Rayleigh step so that the sliding surfaces are separated from each other and the sealing target fluid is interposed between the sliding surfaces during the relative rotation of the sliding components. Thus, lubricity is improved. On the other hand, since the reverse Rayleigh step generates a relatively negative pressure and the reverse Rayleigh step is disposed on the leakage side compared to the Rayleigh step, the high-pressure sealing target fluid flowing from the Rayleigh step between the sliding surfaces can be sucked into the reverse Rayleigh step. Further, a deep groove having a volume larger than that of the reverse Rayleigh step is provided on the relative rotation terminating end side of the reverse Rayleigh step and the sealing target fluid collected by the reverse Rayleigh step is returned toward the sealing target fluid through the deep groove. In this way, since the sealing target fluid between the pair of sliding components is prevented from leaking to the leakage side, sealing performance is improved.

CITATION LIST

Patent Literature

Patent Citation 1: WO 2012/046749 A (Pages 14 to 16, FIG. 1)

SUMMARY OF INVENTION

Technical Problem

In the sliding component shown in Patent Citation 1, the sealing target fluid in the reverse Rayleigh step provided in one sliding component moves from the reverse Rayleigh step toward the deep groove in accordance with the relative rotation of the facing other sliding component. However, since the flow path cross-sectional area of the reverse Rayleigh step is constant in the circumferential direction, the movement amount of the sealing target fluid from the reverse Rayleigh step to the deep groove depends on the relative rotation speed of the sliding component. Particularly when the sliding component rotates at a speed higher than a certain level, the upper sealing target fluid in the reverse Rayleigh step follows the movement of the other sliding component, but the sealing target fluid on the side of the bottom surface does not easily follow the movement of the other sliding component. As a result, since the movement amount of the sealing target fluid in the reverse Rayleigh step does not increase as the relative rotation speed increases, there is a risk that a sufficient negative pressure is not generated in the reverse Rayleigh step.

The present invention has been made in view of such problems and an object thereof is to provide a sliding component capable of reliably generating a negative pressure in a shallow groove regardless of a relative rotation speed of the other sliding component.

Solution to Problem

In order to solve the foregoing problems, a sliding component according the present invention is a sliding component formed in an annular shape and disposed at a relatively rotating position of a rotating machine and sliding relative to other sliding component, wherein a sliding surface of the sliding component is provided with a shallow groove extending in a circumferential direction and generating a negative pressure and a deep groove collecting a sealing target fluid in the shallow groove and deeper than the shallow groove, and wherein the shallow groove has a terminating end portion in which a cross-sectional area of a flow path thereof becomes narrow toward the deep groove. According to the aforesaid feature of the present invention, since the flow path cross-sectional area of the terminating end portion of the shallow groove becomes narrow toward the deep groove, the pressure of the sealing target fluid in the shallow groove is increased at the terminating end portion during the relative rotation of the sliding components and the sealing target fluid of the terminating end portion is likely to enter the deep groove since the deep groove is disposed on the downstream side. In this way, it is possible to reliably generate the negative pressure in the shallow groove regardless of the rotation speed of the sliding component. Further, since the sealing target fluid of the terminating end portion of the shallow groove flows into the deep groove, it is possible to suppress the positive pressure from being generated between the sliding surfaces due to the shallow groove.

It may be preferable that the terminating end portion of the shallow groove becomes gradually shallow toward the deep groove. According to this preferable configuration, since the sealing target fluid aggregates from the terminating end portion of the shallow groove to the deep groove to be directed from the bottom surface of the shallow groove toward the sliding surface, the sealing target fluid is easily influenced by the flow of the sliding surface and a large amount of the sealing target fluid can flow into the deep groove.

It may be preferable that a bottom surface of the terminating end portion of the shallow groove is curved to be depressed toward the deep groove. According to this preferable configuration, it is possible to decrease the size of the region in which the pressure of the sealing target fluid increases at the terminating end portion.

It may be preferable that the deep groove communicates with a side of the sealing target fluid. According to this preferable configuration, it is possible to return the sealing target fluid collected to the deep groove toward the sealing target fluid.

It may be preferable that the shallow groove extends over entire circumference of the sliding surface of the sliding component and has a starting end portion continuous to the deep groove in the circumferential direction. According to this preferable configuration, it is possible to generate the negative pressure over the entire circumference of the sliding surface of the sliding component.

It may be preferable that the shallow groove and the deep groove are equiangularly disposed in the circumferential direction of the sliding surface of the sliding component and the shallow groove is formed in a symmetrical shape with respect to a line passing through the deep groove and extending in a radial direction. According to this preferable configuration, both grooves can be used regardless of the relative rotation direction of the sliding component. Further, since the sealing target fluid does not easily flow into the shallow groove on the side of the relative rotation terminating end in relation to the deep groove, it is also possible to generate the negative pressure in the shallow groove on the side of the relative rotation terminating end.

In addition, the fact that the shallow groove of the sliding component according to the present invention extends in the circumferential direction means that the shallow groove may extend with at least a circumferential component and may preferably extend so that a circumferential component becomes larger than a radial component. Further, the fact that the deep groove extends in the radial direction means that the deep groove may extend with at least a radial component and may preferably extend so that a radial component becomes larger than a circumferential component.

In addition, the sealing target fluid may be a gas or a liquid, and may be a mist in which a liquid and a gas are mixed.

DESCRIPTION OF EMBODIMENTS

Figure 1:
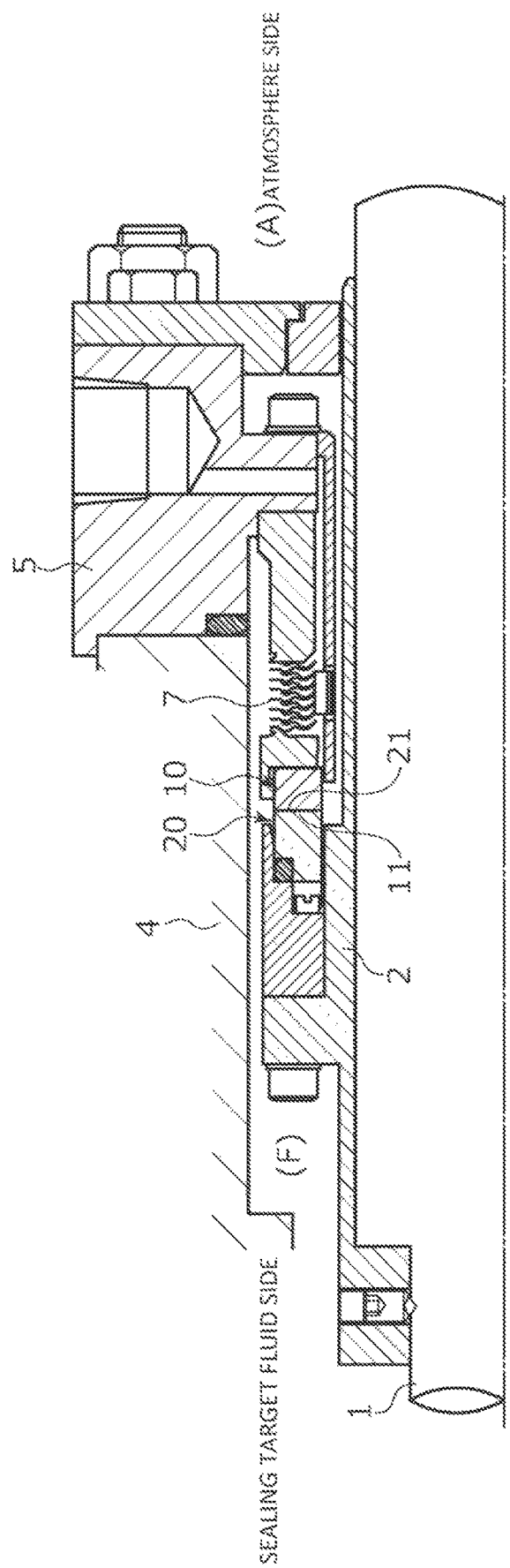
FIG. 1 is a longitudinal sectional view showing an example of a mechanical seal including a sliding component according to a first embodiment of the present invention.

Modes for carrying out a sliding component according to the present invention will be described below on the basis of the embodiments.

First Embodiment

A sliding component according to a first embodiment of the present invention will be described with reference to FIGS. 1 to 5. Additionally, in this embodiment, an embodiment in which a sliding component is a mechanical seal will be described as an example. Further, a description will be made such that an outer radial side of a sliding component constituting a mechanical seal is a sealing target fluid side (i.e., high-pressure side) and an inner radial side thereof is an atmosphere side (i.e., low-pressure side) corresponding to a leakage side. Further, for convenience of description, in the drawings, dots may be added to a groove and the like formed on a sliding surface.

A mechanical seal for general industrial machines shown in FIG. 1 is of an inside type that seals a sealing target fluid F that tends to leak from the outer radial side toward the inner radial side of the sliding surface. Additionally, in this embodiment, an embodiment in which the sealing target fluid F is a high-pressure gas is illustrated.

The mechanical seal mainly includes a rotating seal ring 20 which is an annular sliding component provided in a rotary shaft 1 through a sleeve 2 to be rotatable together with the rotary shaft 1 and an annular stationary seal ring 10 which is a sliding component provided in a seal cover 5 fixed to a housing 4 of an attachment target device not to be rotatable and to be movable in the axial direction and when a bellows 7 urges the stationary seal ring 10 in the axial direction, a sliding surface 11 of the stationary seal ring 10 and a sliding surface 21 of the rotating seal ring 20 slide closely with each other. Additionally, the sliding surface 21 of the rotating seal ring 20 is formed as a flat surface and this flat surface is not provided with a concave portion.

The stationary seal ring 10 and the rotating seal ring 20 are typically formed of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., a coating material), a composite material, and the like can also be applied.

Figure 2:
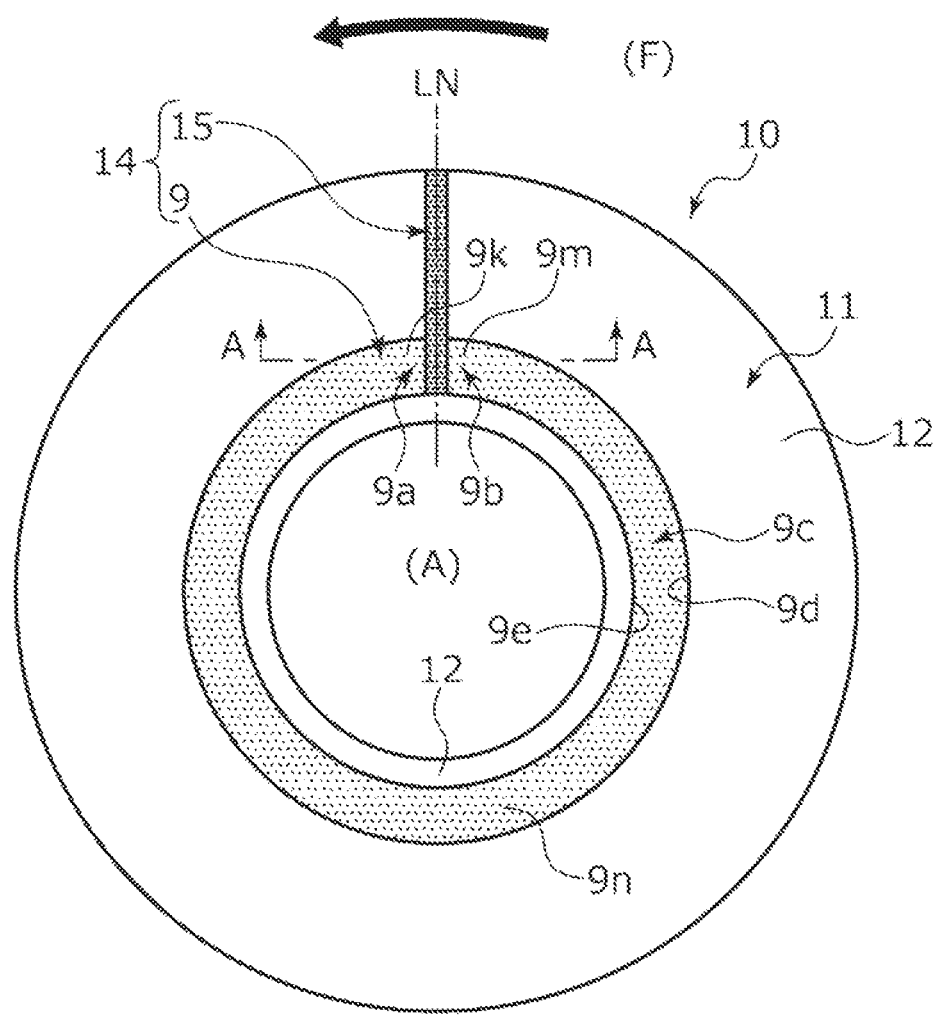
FIG. 2 is a view showing a sliding surface of a stationary seal ring from the axial direction in the first embodiment.

As shown in FIG. 2, the rotating seal ring 20 slides relative to the stationary seal ring 10 as indicated by the arrow. The sliding surface 11 of the stationary seal ring 10 is provided with a negative pressure generation mechanism 14. The negative pressure generation mechanism 14 includes a fluid guide groove portion 15 which is a deep groove communicating with the side of the sealing target fluid F and extending in the inner radial direction and a negative pressure generation shallow groove 9 which extends in the circumferential direction concentrically with the stationary seal ring 10 from the circumferential end portion on the downstream side of the inner radial side of the fluid guide groove portion 15 and is continuously provided at the circumferential end portion on the upstream side of the inner radial side of the fluid guide groove portion 15. Additionally, a portion of the sliding surface 11 other than the negative pressure generation mechanism 14 is a land 12 forming a flat end surface. Further, although not shown in the drawings, the land 12 which is located on the outer radial side of the shallow groove 9 is provided with, for example, a positive pressure generation mechanism such as a dimple.

Next, the outline of the negative pressure generation mechanism 14 will be described with reference to FIGS. 2 and 3. Additionally, hereinafter, in FIG. 2, the end portion of the shallow groove 9 continuously provided on the left side of the paper surface of the fluid guide groove portion 15 will be described as a relative rotation starting end portion 9a of the shallow groove 9, that is, the upstream side of the sealing target fluid F flowing through the shallow groove 9 and the end portion of the shallow groove 9 continuously provided on the right side of the paper surface of the fluid guide groove portion 15 will be described as a relative rotation terminating end portion 9b of the shallow groove 9, that is, the downstream side of the sealing target fluid F flowing through the shallow groove 9. Additionally, for convenience of description, the depth of the shallow groove 9 is depicted to be deeper than the actual depth.

The fluid guide groove portion 15 of this first embodiment extends in the radial direction of the stationary seal ring 10. Further, the fluid guide groove portion 15 is continuously provided in the starting end portion 9a and the terminating end portion 9b of the shallow groove 9. That is, these are arranged side by side in the circumferential direction. The shallow groove 9 includes a bottom surface 9c, an outer surface 9d which rises from the outer radial side of the bottom surface 9c, and an inner surface 9e which rises from the inner radial side of the bottom surface 9c. The outer surface 9d and the inner surface 9e are parallel to each other and are orthogonal to the flat surface of the land 12.

Figure 3:
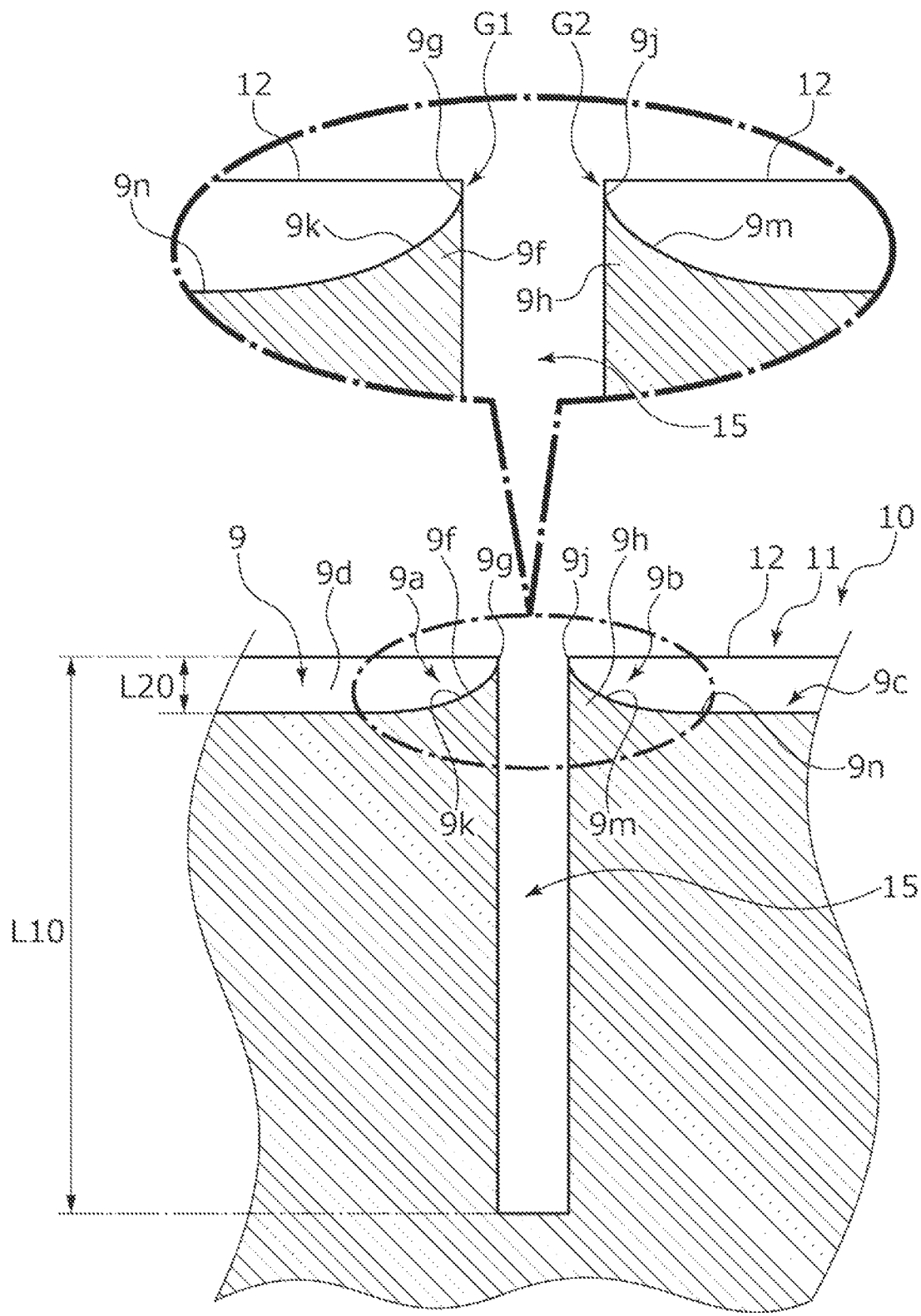
FIG. 3 is a cross-sectional view taken along the line A-A of FIG. 2.

Particularly, as shown in FIG. 3, in the bottom surface 9c, a bottom surface 9k in the vicinity of the starting end portion 9a of the shallow groove 9 extends in an arc shape to protrude toward the side opposite to the sliding surface 11 and the depth of the shallow groove 9 gradually decreases toward the starting end of the shallow groove 9. That is, a cross-section (a cross-section shown in FIG. 3, that is, a circumferential cross-section) obtained by cutting the vicinity of the starting end portion 9a of the shallow groove 9 in a plane orthogonal to the fluid guide groove portion 15 is curved to be depressed toward the fluid guide groove portion 15.

The starting end portion 9a of the shallow groove 9 is provided with a wall portion 9f which defines the shallow groove 9 and the fluid guide groove portion 15. Further, a top portion 9g of the wall portion 9f is formed in a linear shape extending in the radial direction and is provided at a position slightly deeper than the flat end surface of the land 12, that is, the upper surface of FIG. 3, that is, a position on the side of the bottom surface 9c. The shallow groove 9 and the fluid guide groove portion 15 communicate with each other in a space G1 on the side of the flat end surface of the land 12 in the top portion 9g. In this way, the flow path cross-sectional area of the starting end portion 9a of the shallow groove 9 gradually decreases toward the fluid guide groove portion 15.

Further, in the bottom surface 9c, a bottom surface 9m in the vicinity of the terminating end portion 9b of the shallow groove 9 extends in an arc shape to protrude toward the side opposite to the sliding surface 11 and the depth of the shallow groove 9 gradually decreases toward the terminating end of the shallow groove 9. That is, a cross-section obtained by cutting the vicinity of the terminating end portion 9b of the shallow groove 9 in a plane orthogonal to the fluid guide groove portion 15 is curved to be depressed toward the fluid guide groove portion 15.

The terminating end portion 9b of the shallow groove 9 is provided with a wall portion 9h which defines the shallow groove 9 and the fluid guide groove portion 15. Further, a top portion 9j of the wall portion 9h is provided at a position slightly deeper than the flat end surface of the land 12, that is, a position on the side of the bottom surface 9c. The shallow groove 9 and the fluid guide groove portion 15 communicate with each other in a space G2 on the side of the flat end surface of the land 12 in the top portion 9j. In this way, the flow path cross-sectional area of the terminating end portion 9b of the shallow groove 9 gradually decreases toward the fluid guide groove portion 15.

Further, in the bottom surface 9c, a bottom surface 9n between the bottom surface 9k in the vicinity of the starting end portion 9a and the bottom surface 9m in the vicinity of the terminating end portion 9b is formed as a flat surface which is parallel to the flat end surface of the land 12 and is the deepest in the shallow groove 9.

Further, the vicinity of the starting end portion 9a of the shallow groove 9 and the vicinity of the terminating end portion 9b of the shallow groove 9 form a symmetrical shape with respect to a line LN (see FIG. 2) extending in the radial direction along the fluid guide groove portion 15.

Further, the depth dimension L10 of the fluid guide groove portion 15 is deeper than the deepest portion of the shallow groove 9, that is, the depth dimension L20 from the flat end surface of the land 12 to the bottom surface 9n of the shallow groove 9 (L10>L20).

Specifically, the depth dimension L10 of the fluid guide groove portion 15 of this first embodiment is formed to be 100 μm and the depth dimension L20 of the shallow groove 9 is formed to be 1 μm. Additionally, if the depth dimension of the fluid guide groove portion 15 is formed to be deeper than the depth dimension of the shallow groove 9, the depth dimensions of the fluid guide groove portion 15 and the shallow groove 9 can be freely changed and the dimension L10 is preferably five times or more the dimension L20.

Figure 4:
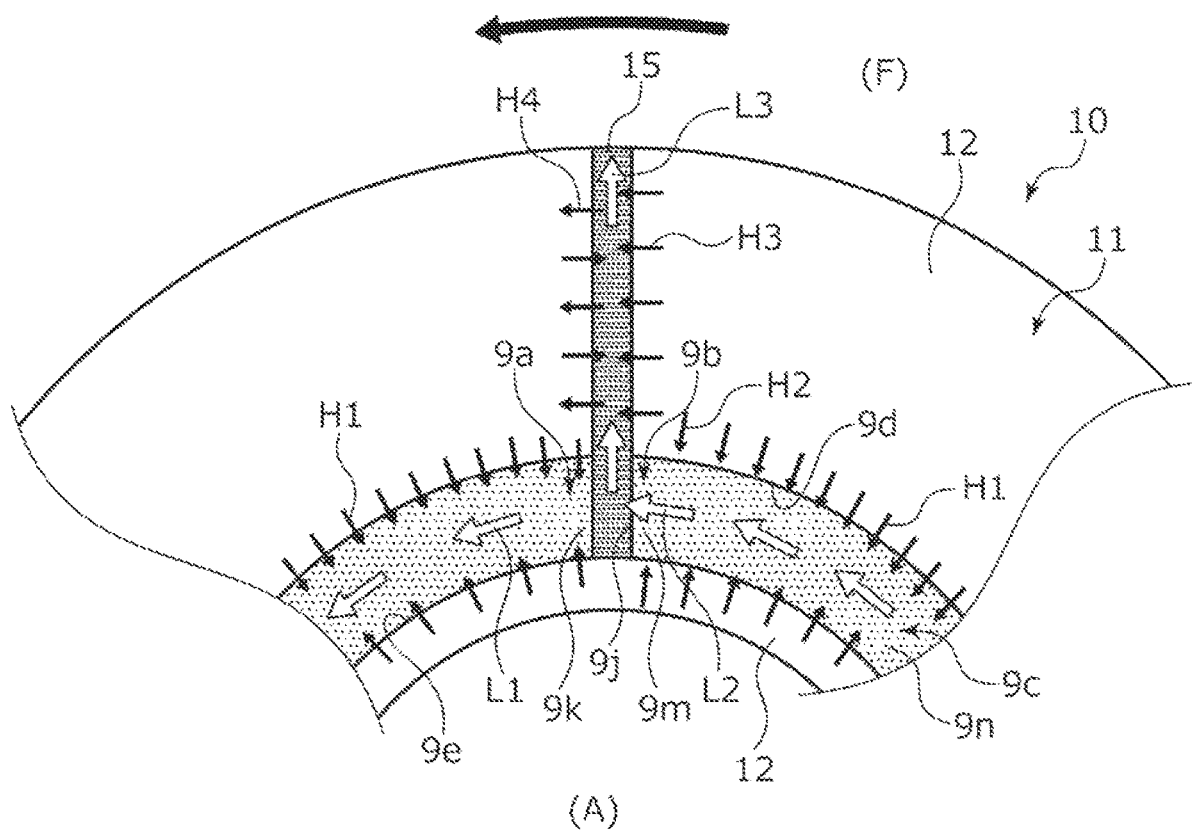
FIG. 4 is an explanatory diagram showing the vicinity of a fluid guide groove portion in a negative pressure generation mechanism from the axial direction in the first embodiment.
Figure 5:
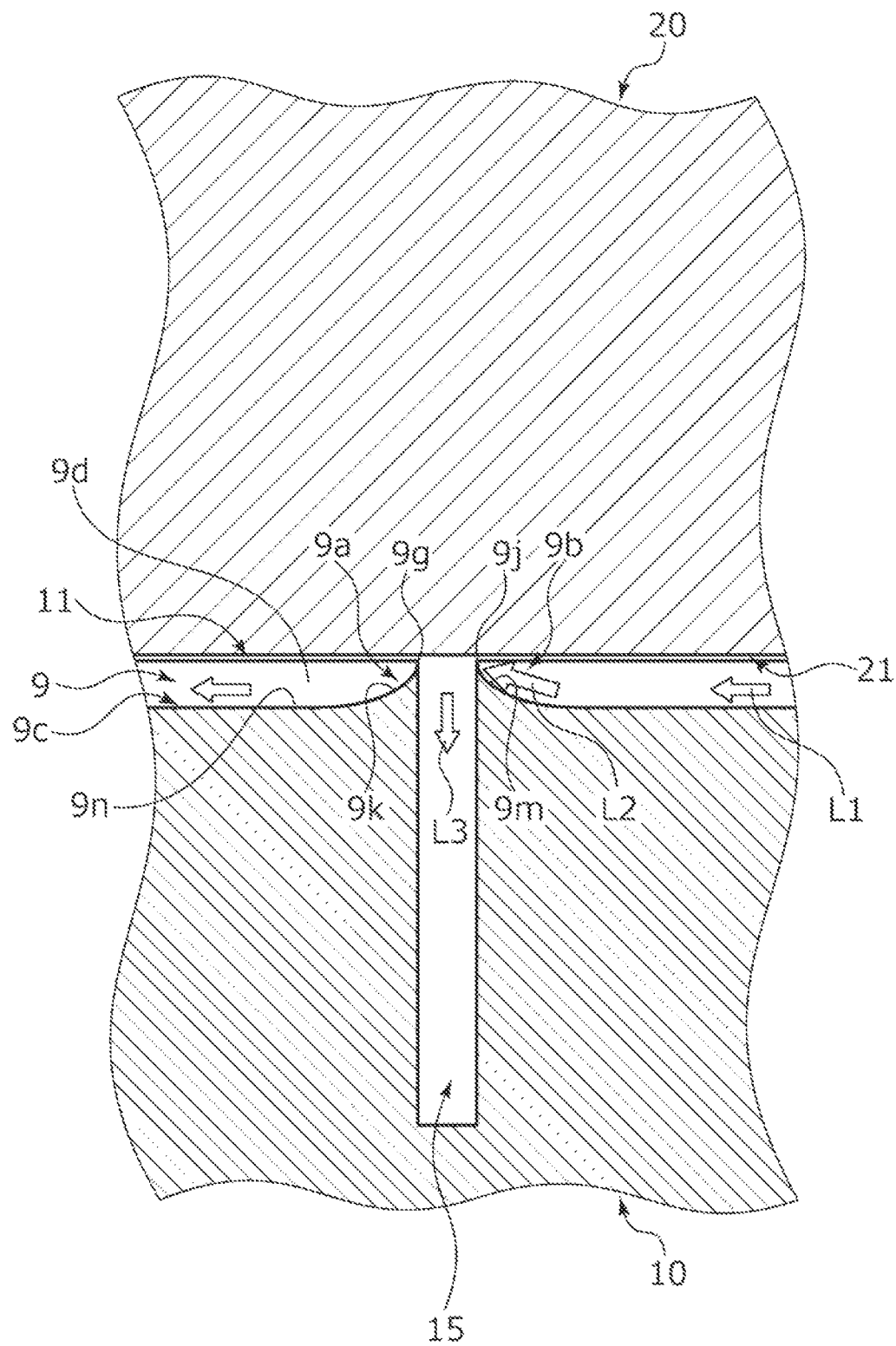
FIG. 5 is a schematic cross-sectional view in which the vicinity of the fluid guide groove portion is cut in a plane orthogonal to the fluid guide groove portion in the first embodiment.

Next, an operation during the relative rotation of the stationary seal ring 10 and the rotating seal ring 20 will be described with reference to FIGS. 4 and 5. First, the sealing target fluid F flows into the shallow groove 9 through the fluid guide groove portion 15 during the non-operation of the general industrial machine in which the rotating seal ring 20 is not rotating. Additionally, since the bellows 7 urges the stationary seal ring 10 toward the rotating seal ring 20, there is almost no leakage amount to the low-pressure side from between the sliding surfaces 11 and 21.

When the rotating seal ring 20 rotates relative to the stationary seal ring 10, the sealing target fluid F on the outer radial side of the sliding surfaces 11 and 21 is drawn between the sliding surfaces 11 and 21 and the sliding surfaces 11 and 21 are slightly separated from each other by the positive pressure generated by the positive pressure generation mechanism (not shown) described above. Further, as shown in FIGS. 4 and 5, the sealing target fluid F flowing into the shallow groove 9 follows the rotation direction of the rotating seal ring 20 due to the friction with the sliding surface 21 as indicated by the arrow L1.

Since the flow path cross-sectional area of the terminating end portion 9b of the shallow groove 9 gradually decreases toward the fluid guide groove portion 15, the fluid aggregates. Accordingly, the pressure in the vicinity of the terminating end portion 9b becomes highest and the sealing target fluid F whose pressure has been increased flows into the fluid guide groove portion 15 through a space surrounded by the outer surface 9d, the inner surface 9e, the top portion 9j, and the sliding surface 21 of the rotating seal ring 20 as indicated by the arrow L2. However, since the fluid guide groove portion 15 has a space sufficient for dispersing the fluid, the aggregated fluid is dispersed, the increased pressure is reduced by the dispersion of the fluid, and the sealing target fluid F having a high pressure does not flow into the downstream shallow groove 9, that is, the starting end portion 9a. On the other hand, since the volume of the shallow groove 9 on the downstream side of the top portion 9g suddenly increases at the starting end portion 9a of the shallow groove 9, the fluid is dispersed, a negative pressure is generated, and the negative pressure reaches the entire region of the shallow groove 9.

Further, when the relative rotation speed of the stationary seal ring 10 and the rotating seal ring 20 exceeds a certain level, the sealing target fluid F in the fluid guide groove portion 15 is pushed out toward the outer radial side as indicated by the arrow L3 by the sealing target fluid F flowing from the terminating end portion 9b of the shallow groove 9. Further, since the sealing target fluid F flows between the sliding surfaces 11 and 21 from the outer radial side and the inside of the fluid guide groove portion 15 at any time during the relative rotation of the stationary seal ring 10 and the rotating seal ring 20, lubricity is excellent.

At this time, the sealing target fluid F in the periphery of the portion other than the terminating end portion 9b of the shallow groove 9 is sucked into the shallow groove 9 as indicated by the arrow H1 by the negative pressure generated in the shallow groove 9. On the other hand, since the sealing target fluid F in the vicinity of the terminating end portion 9b of the shallow groove 9 has a high pressure as described above, the sealing target fluid almost does not enter the shallow groove 9 while being located at the land 12 as indicated by the arrow H2. Further, the sealing target fluid F in the vicinity of the fluid guide groove portion 15 enters the fluid guide groove portion 15 as indicated by the arrow H3 and a part of the sealing target fluid F in the fluid guide groove portion 15 flows out between the sliding surfaces 11 and 21 due to the friction or the like with the sliding surface 21 as indicated by the arrow H4.

As described above, since the flow path cross-sectional area of the terminating end portion 9b of the shallow groove 9 gradually decreases toward the fluid guide groove portion 15, the pressure of the sealing target fluid F in the shallow groove 9 is less likely to increase, the shallow groove 9 is easily maintained at the negative pressure, and the sealing target fluid F that tends to leak toward the atmosphere can be collected during the relative rotation of the stationary seal ring 10 and the rotating seal ring 20.

Further, since the fluid guide groove portion 15 which is deeper than the shallow groove 9 is disposed on the downstream side of the relative rotation of the terminating end portion 9b of the shallow groove 9, the sealing target fluid F whose pressure has been increased in the vicinity of the terminating end portion 9b flows into the fluid guide groove portion 15, the sealing target fluid F whose pressure has been increased is dispersed in the fluid guide groove portion 15. Accordingly, the outflow of the sealing target fluid between the sliding surfaces 11 and 21 is suppressed and the generation of the positive pressure between the sliding surfaces 11 and 21 can be suppressed. Accordingly, it is possible to prevent a decrease in the negative pressure generation ability of the shallow groove 9. Further, since the sealing target fluid F whose pressure has been increased is dispersed in the fluid guide groove portion 15, the sealing target fluid does not flow into the downstream shallow groove 9 and the negative pressure can be suitably generated in the downstream shallow groove 9.

Further, since the terminating end portion 9b of the shallow groove 9 communicates with the fluid guide groove portion 15, the outflow of the sealing target fluid F whose pressure has been increased is suppressed between the sliding surfaces 11 and 21 and the generation of the positive pressure between the sliding surfaces 11 and 21 is suppressed.

Further, the bottom surface 9c in the vicinity of the terminating end portion 9b of the shallow groove 9 becomes gradually shallow toward the fluid guide groove portion 15. Accordingly, since the sealing target fluid F aggregates from the terminating end portion 9b of the shallow groove 9 to the fluid guide groove portion 15 to be directed from the bottom surface 9n of the shallow groove 9 toward the sliding surface, the sealing target fluid F is easily influenced by the flow of the sliding surface and a large amount of the sealing target fluid can flow into the fluid guide groove portion 15 on the downstream side.

Further, since the bottom surface 9c of the terminating end portion 9b of the shallow groove 9 is curved to be depressed toward the fluid guide groove portion 15 and the top portion 9j corresponding to the terminal portion of the terminating end portion 9b is directed toward the facing sliding surface 21, that is, the axial direction of the stationary seal ring 10, a region in which the pressure of the sealing target fluid F increases in the terminating end portion 9b can be decreased in size in the circumferential direction. That is, it is possible to largely ensure the negative pressure generation region of the shallow groove 9. Further, the pressure of the sealing target fluid F in the shallow groove 9 is maintained not to increase to a position just before the upstream side of the fluid guide groove portion 15 and the pressure increase position is likely to be disposed in the vicinity of the boundary between the terminating end portion 9b and the fluid guide groove portion 15. Therefore, it is difficult for the sealing target fluid F whose pressure has been increased to return to the shallow groove 9 and it is easy to maintain the shallow groove 9 at the negative pressure.

Further, since the bottom surface 9c of the terminating end portion 9b of the shallow groove 9 is curved to be depressed toward the fluid guide groove portion 15, the flow of the sealing target fluid F in the shallow groove 9 is less likely to be disturbed and the flow of the sealing target fluid F becomes smooth.

Further, since the fluid guide groove portion 15 communicates with the sealing target fluid side of the outer radial side, the sealing target fluid F collected from the shallow groove 9 can be returned toward the sealing target fluid F of the outer radial side. Further, the sealing target fluid F can be easily returned toward the sealing target fluid F of the outer radial side by the centrifugal force and the leakage of the sealing target fluid F to the low-pressure side of the inner radial side of the sliding surfaces 11 and 21 can be reduced during the relative rotation of the stationary seal ring 10 and the rotating seal ring 20.

Further, since the shallow groove 9 extends concentrically over the entire circumference of the sliding surface 11 and communicates with one fluid guide groove portion 15 at the starting end portion 9a and the terminating end portion 9b in the circumferential direction, it is possible to generate the negative pressure of the shallow groove 9 over the entire circumference of the sliding surface 11.

Further, since the starting end portion 9a of the shallow groove 9 communicates with the fluid guide groove portion 15 through the space G1 and the sealing target fluid F does not easily enter the starting end portion 9a of the shallow groove 9 from the fluid guide groove portion 15 during the relative rotation of the stationary seal ring 10 and the rotating seal ring 20, it is possible to generate a large negative pressure in the shallow groove 9.

Further, since the starting end portion 9a and the terminating end portion 9b of the shallow groove 9 form the symmetrical shape with respect to the line LN extending in the radial direction along the fluid guide groove portion 15, both end portions can be used regardless of the relative rotation direction of the stationary seal ring 10 and the rotating seal ring 20.

Figure 6:
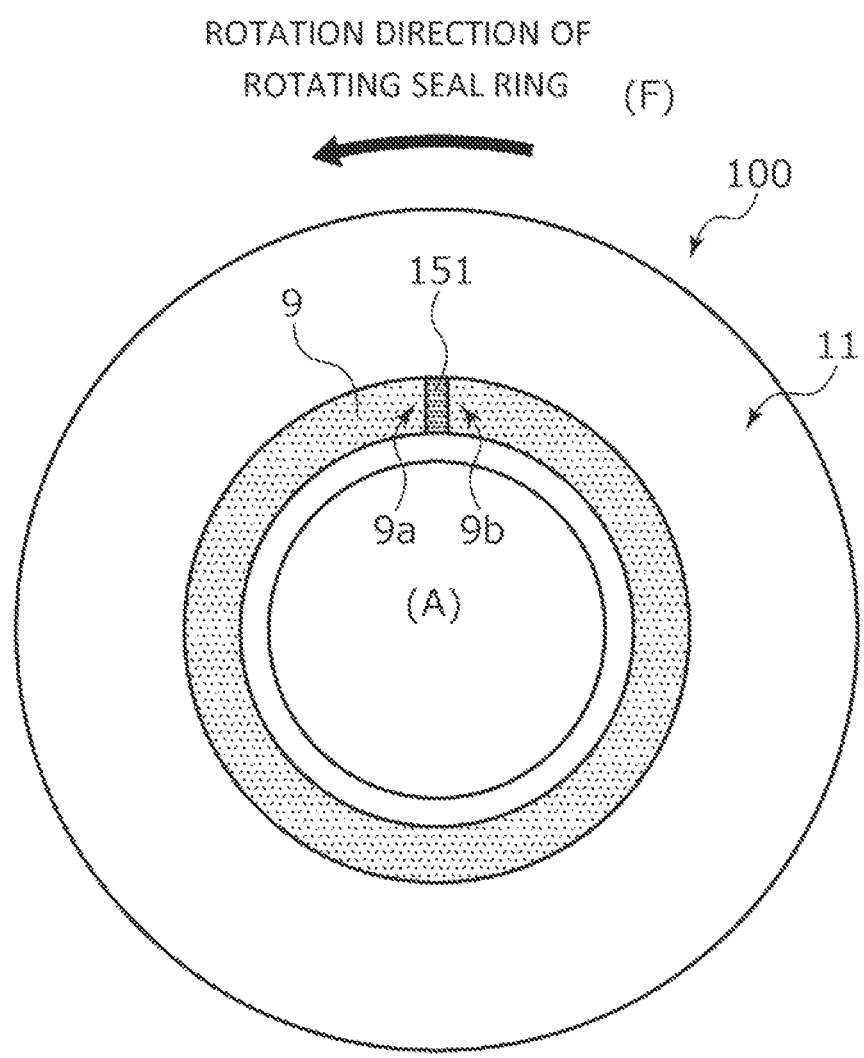
FIG. 6 is an explanatory diagram showing a first modified example of a stationary seal ring of the first embodiment.

Further, in the first embodiment, an embodiment in which the fluid guide groove portion 15 communicates with the side of the sealing target fluid F of the outer radial side has been exemplified as the deep groove, but the present invention is not limited thereto. For example, as in a stationary seal ring 100 of a first modified example shown in FIG. 6, a fluid guide groove portion 151 which is a deep groove may not communicate with the side of the atmosphere A and the side of the sealing target fluid F in the stationary seal ring 10.

Figure 7:
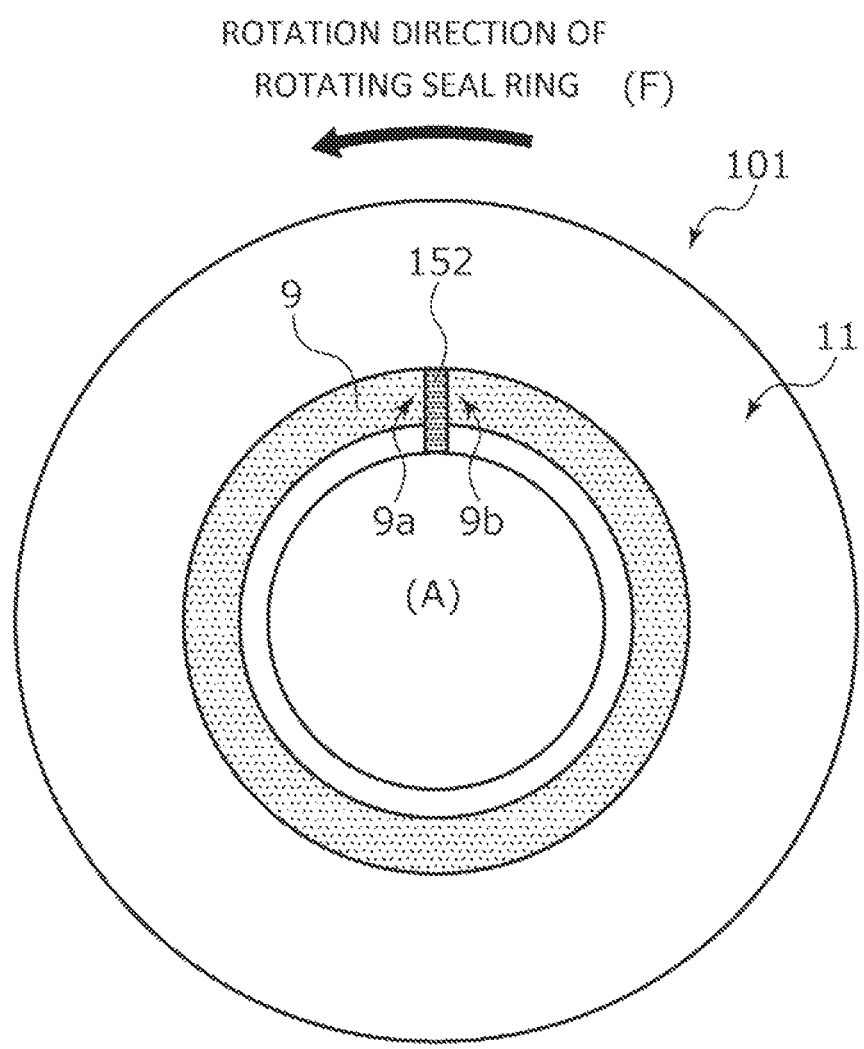
FIG. 7 is an explanatory diagram showing a second modified example of the stationary seal ring of the first embodiment.

Further, when the amount of the sealing target fluid F flowing out from the terminating end portion 9b of the shallow groove 9 is small, that is, the amount is within an allowable leakage amount to the leakage side, a fluid guide groove portion 152 which is a deep groove may communicate with the side of the atmosphere A of the inner radial side of a stationary seal ring 101, for example, as in the stationary seal ring 101 of a second modified example shown in FIG. 7.

That is, the size or shape of the deep groove may be freely changed if the sealing target fluid F flowing out from the terminating end portion 9b of the shallow groove 9 can be collected to a degree that the positive pressure is not generated between the sliding surfaces 11 and 21 or the positive pressure can be suppressed.

Figure 8:
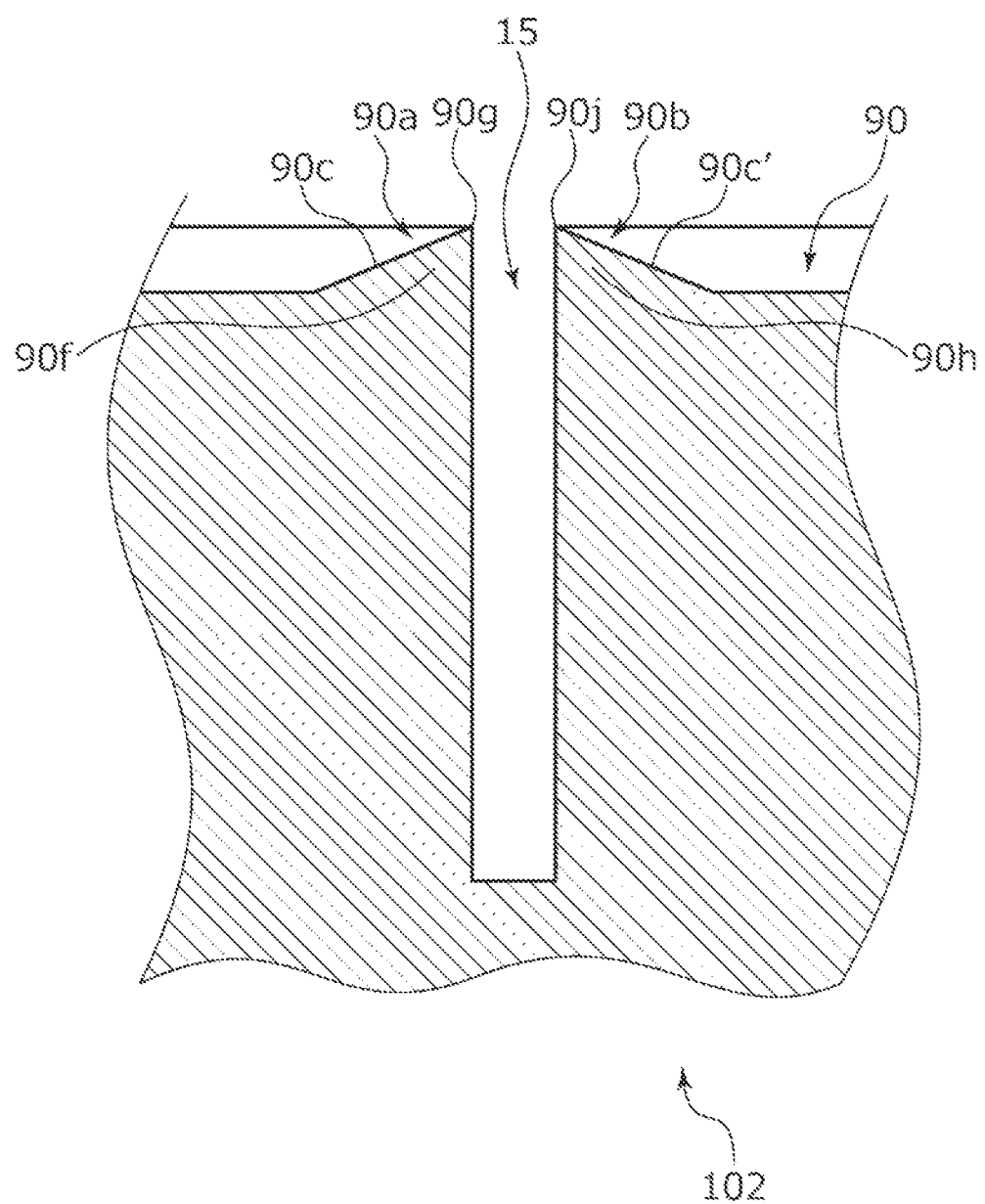
FIG. 8 is an explanatory diagram showing a third modified example of the stationary seal ring of the first embodiment.

Further, in the first embodiment, an embodiment in which the starting end portion 9a of the shallow groove 9 and the bottom surface 9c of the terminating end portion 9b are curved to be depressed toward the fluid guide groove portion 15 has been illustrated, but the present invention is not limited thereto. For example, as in a stationary seal ring 102 of a third modified example shown in FIG. 8, a bottom surface 90c of a starting end portion 90a of a shallow groove 90 may extend obliquely in a linear shape toward an end surface 90g of a wall portion 90f and a bottom surface 90c' of a terminating end portion 90b may extend obliquely in a linear shape toward an end surface 90j of a wall portion 90h. Accordingly, the flow of the sealing target fluid F flowing from the inside of the shallow groove 90 toward the fluid guide groove portion 15 can be smoothed.

Figure 9:
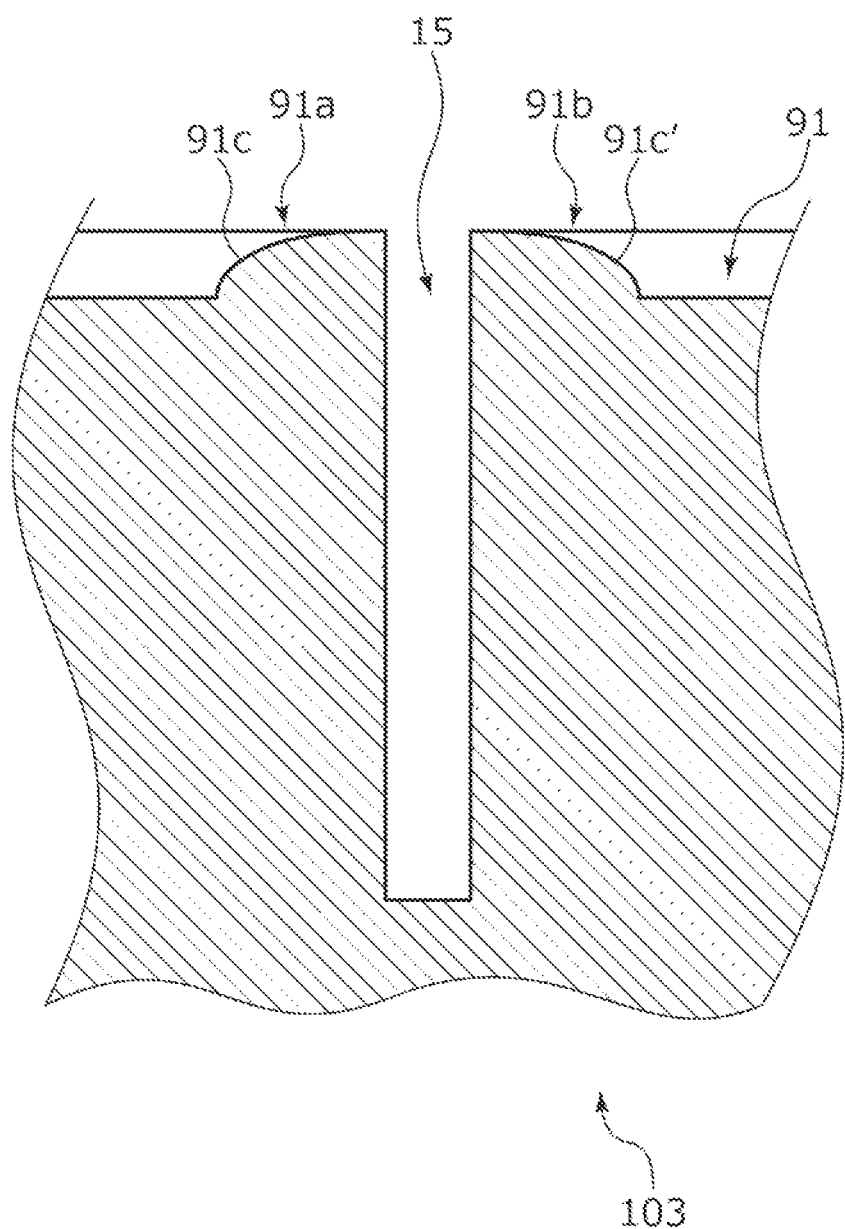
FIG. 9 is an explanatory diagram showing a fourth modified example of the stationary seal ring of the first embodiment.

Further, for example, as in a stationary seal ring 103 of a fourth modified example shown in FIG. 9, a bottom surface 91c of a starting end portion 91a of a shallow groove 91 and a bottom surface 91c' of a terminating end portion 91b may be curved to bulge in the direction opposite to the circumferential direction of the fluid guide groove portion 15.

That is, the cross-sectional shape of the shallow groove may be freely changed if the starting end portion and the terminating end portion of the shallow groove become gradually shallow toward the deep groove. Additionally, when the relative rotation direction of the sliding component is only one direction, at least the terminating end portion of the shallow groove may become gradually shallow toward the deep groove.

In addition, in this embodiment, an embodiment in which the terminating end portion 9b of the shallow groove 9 becomes gradually shallow toward the fluid guide groove portion 15 and the radial width of the shallow groove 9 is constant over the circumferential direction has been illustrated. Although this embodiment is more preferable, the present invention is not limited thereto. For example, the radial width of the terminating end portion of the shallow groove may become gradually narrow. That is, the terminating end portion of the shallow groove may be formed so that the flow path cross-sectional area becomes narrow toward the deep groove.

Figure 10:
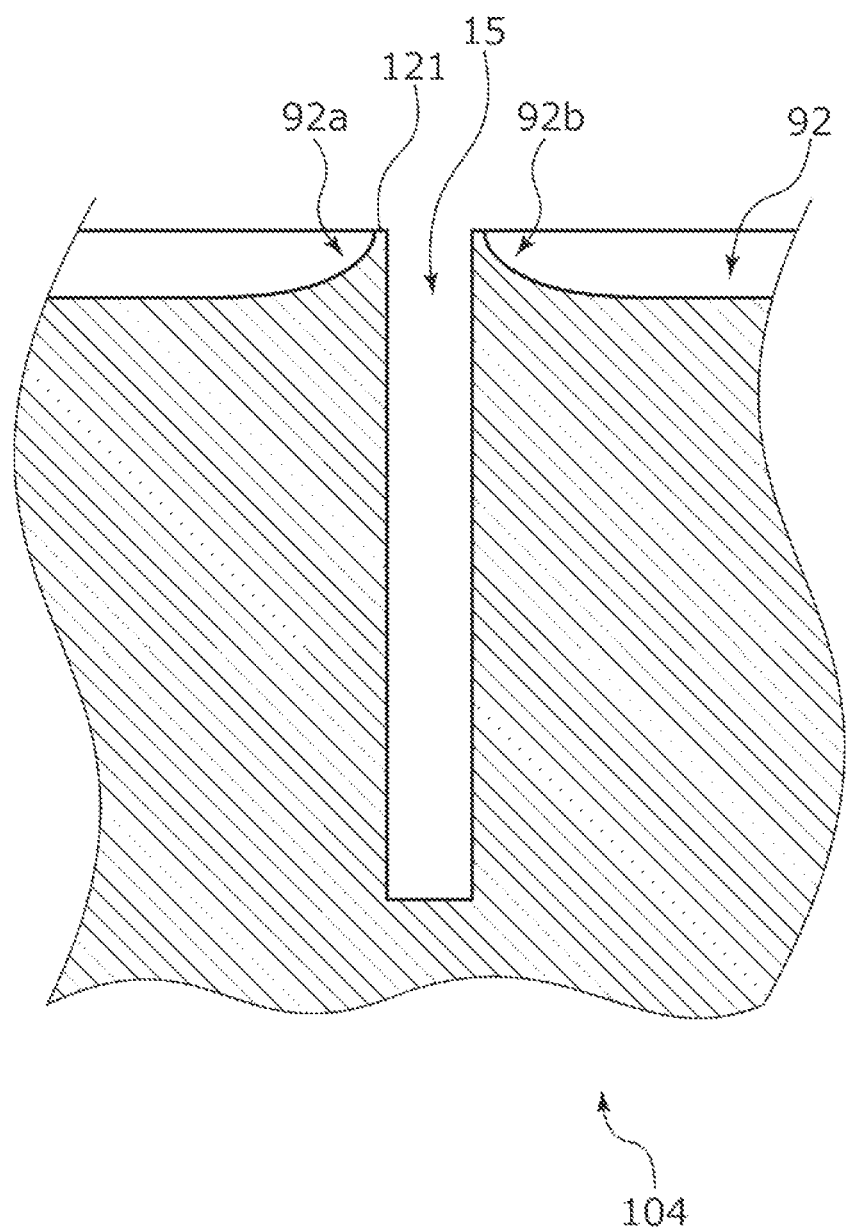
FIG. 10 is an explanatory diagram showing a fifth modified example of the stationary seal ring of the first embodiment.

Further, in the first embodiment, an embodiment in which the starting end portion 9a and the terminating end portion 9b of the shallow groove 9 communicate with the fluid guide groove portion 15 has been illustrated, but as in a stationary seal ring 104 of a fifth modified example shown in FIG. 10, a land 121 may be formed between the starting end portion 92a and the terminating end portion 92b of the shallow groove 92 and the fluid guide groove portion 15. That is, the fluid guide groove portion 15 may be disposed adjacent to the downstream side of the terminating end portion 9b.

Figure 11:
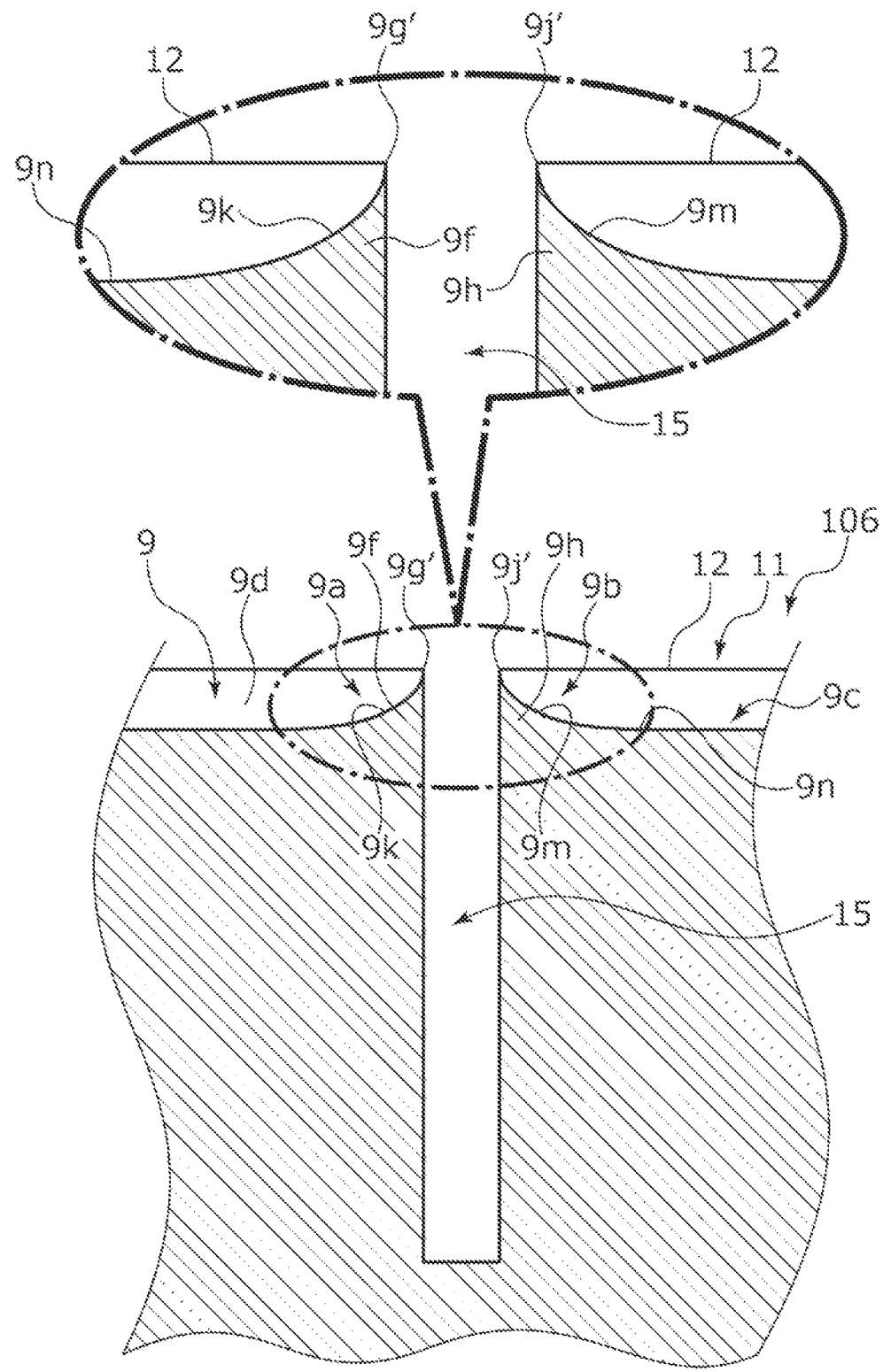
FIG. 11 is an explanatory diagram showing a sixth modified example of the stationary seal ring of the first embodiment.

Further, in the first embodiment, an embodiment in which the top portion 9g of the wall portion 9f and the top portion 9j of the wall portion 9h of the shallow groove 9 are arranged at a position slightly closer to the bottom surface 9c than the flat end surface of the land 12 has been described, but the present invention is not limited thereto. For example, as in a stationary seal ring 106 of a sixth modified example shown in FIG. 11, a top portion 9g' and a top portion 9j' of the shallow groove 9 may be disposed on the same plane as the flat end surface of the land 12. That is, the starting end portion and the terminating end portion of the shallow groove may not communicate with the deep groove if the positive pressure exceeding an allowable value can be prevented from being generated between the sliding surfaces of the sliding components.

Second Embodiment

Next, a sliding component according to a second embodiment of the present invention will be described with reference to FIG. 12. In addition, the description of the configuration overlapping with the same configuration as that of the above-described embodiment will be omitted.

Figure 12:
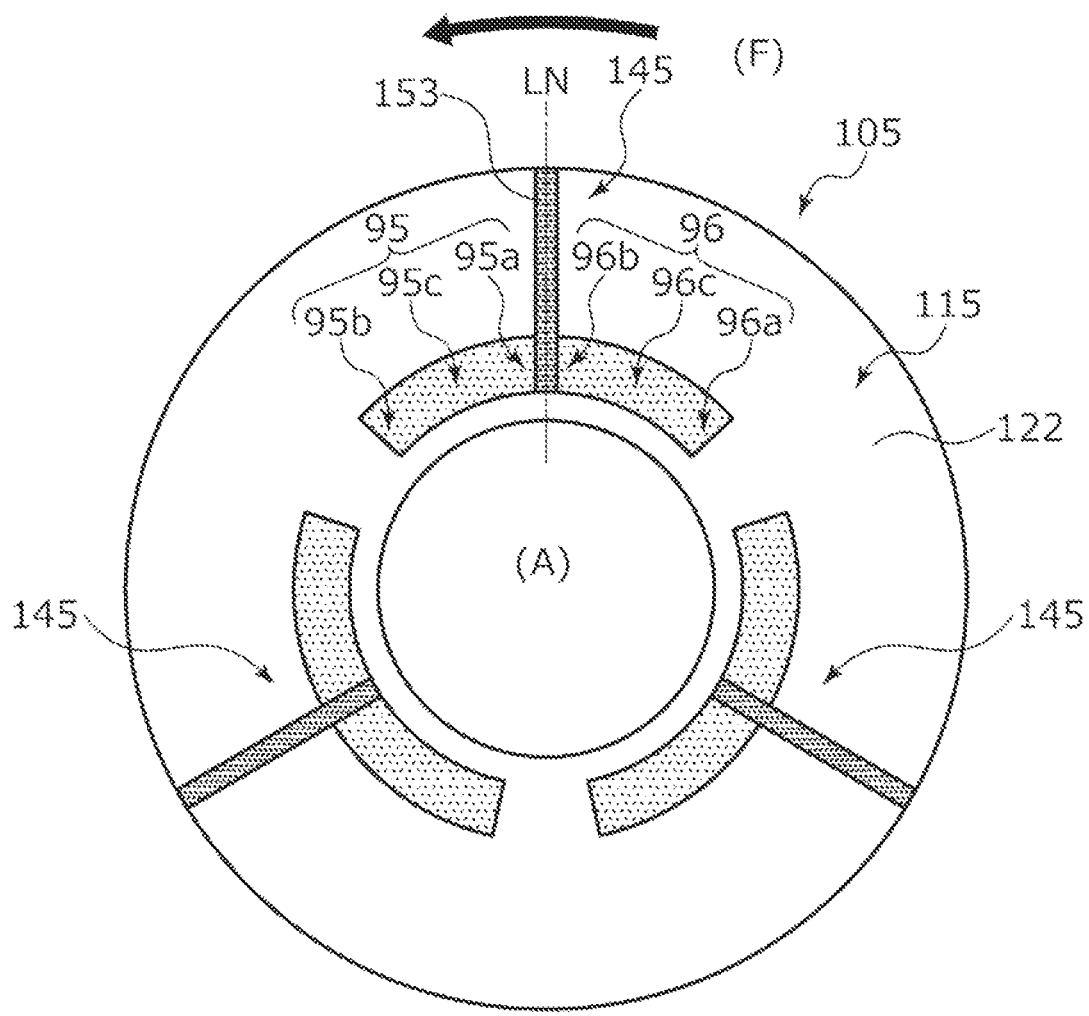
FIG. 12 is a view showing a sliding surface of a stationary seal ring as a sliding component according to a second embodiment of the present invention from the axial direction.

As shown in FIG. 12, a plurality of (in this embodiment, three) negative pressure generation mechanisms 145 are formed on a sliding surface 115 of a stationary seal ring 105 of the second embodiment to be separated from each other in the circumferential direction. The negative pressure generation mechanism 145 includes a fluid guide groove portion 153 which extends from the outer radial side toward the inner radial side, a first shallow groove 95 which extends from the inner radial end portion of the fluid guide groove portion 153 toward the relative rotation terminating end side, that is, counterclockwise on the paper surface and has an arc shape when viewed from the axial direction, and a second shallow groove 96 which extends from the inner radial end portion of the fluid guide groove portion 153 toward the relative rotation starting end side, that is, clockwise of the paper surface and has an arc shape when viewed from the axial direction.

A starting end portion 95a of the first shallow groove 95 is formed to be shallower than an intermediate portion 95c and a terminating end portion 95b of the first shallow groove 95 and the intermediate portion 95c and the terminating end portion 95b extend in parallel to a flat end surface of a land 122 to have the same depth. Further, a terminating end portion 96b of the second shallow groove 96 is formed to be shallower than a starting end portion 96a and an intermediate portion 96c of the second shallow groove 96 and the starting end portion 96a and the intermediate portion 96c extend in parallel to the flat end surface of the land 122 to have the same depth. That is, the starting end portion 95a of the first shallow groove 95 and the terminating end portion 96b of the second shallow groove 96 are formed to be gradually shallow toward the fluid guide groove portion 153.

Further, since the first shallow groove 95 and the second shallow groove 96 form the symmetrical shape with respect to the line LN extending in the radial direction along the fluid guide groove portion 153, both grooves can be used regardless of the relative rotation direction of the stationary seal ring 105 and the rotating seal ring 20.

When the rotating seal ring 20 rotates relative to the stationary seal ring 105, the sealing target fluid F in the second shallow groove 96 moves from the starting end portion 96a toward the intermediate portion 96c and the terminating end portion 96b since the fluid guide groove portion 153 is disposed on the downstream side of the second shallow groove 96 and the sealing target fluid easily flows into the fluid guide groove portion 153 even when the pressure is increased at the terminating end portion 96b. Further, since the starting end portion 95a of the first shallow groove 95 has a small communication port with the fluid guide groove portion 153, the sealing target fluid F does not easily flow from the fluid guide groove portion 153 into the first shallow groove 95 and the first shallow groove 95 can also generate the negative pressure.

Further, since the sealing target fluid F flowing out from the terminating end portion 95b of the first shallow groove 95 to the sliding surface 115 can be sucked from the starting end portion 96a of the second shallow groove 96 of the adjacent downstream negative pressure generation mechanism 145, it is possible to suppress the sealing target fluid F from leaking to the side of the atmosphere A.

In addition, the terminating end portion 95b of the first shallow groove 95 and the starting end portion 96a of the second shallow groove 96 which are adjacent to each other in the circumferential direction may be continuous in the circumferential direction.

Further, the shapes of the first to sixth modified examples described above may be applied to the sliding component of this second embodiment.

Although the embodiments of the present invention have been described with reference to the drawings, the specific configuration is not limited to these embodiments and is included in the present invention even if there are changes or additions within the scope of the scope of the present invention.

For example, in the above-described embodiments, as the sliding component, the mechanical seal for general industrial machines has been illustrated, but other mechanical seals for automobiles, water pumps, and the like may be used. Further, the present invention is not limited to the mechanical seal and may be a sliding component other than the mechanical seal such as a slide bearing.

Further, in the above-described embodiments, an example in which the negative pressure generation mechanism is provided only in the stationary seal ring has been described, but the negative pressure generation mechanism may be provided in only the rotating seal ring or both the stationary seal ring and the rotating seal ring.

Further, the sealing target fluid side has been described as the high-pressure side and the leakage side has been described as the low-pressure side. However, the sealing target fluid side may be the low-pressure side, the leakage side may be the high-pressure side, and the sealing target fluid side and the leakage side may have substantially the same pressure.

Further, in the above-described embodiments, an embodiment of the inside type that seals the sealing target fluid F tending to leak from the outer radial side of the sliding surface toward the inner radial side thereof has been described, but the present invention is not limited thereto. For example, an outside type that seals the sealing target fluid F tending to leak from the inner radial side of the sliding surface toward the outer radial side thereof may be used.

REFERENCE SIGNS LIST

9 Shallow groove
9a Starting end portion
9b Terminating end portion
9c Bottom surface
10 Stationary seal ring (sliding component)
11 Sliding surface
14 Negative pressure generation mechanism
15 Fluid guide groove portion (deep groove)
20 Rotating seal ring (sliding component)
21 Sliding surface
90 Shallow groove
90a Starting end portion
90b Terminating end portion
91 Shallow groove
91a Starting end portion
91b Terminating end portion
92 Shallow groove
92a Starting end portion
92b Terminating end portion
95 First shallow groove (shallow groove)
95a Starting end portion
95b Terminating end portion
96 Second shallow groove (shallow groove)

96a Starting end portion
96b Terminating end portion
100 to 105 Stationary seal ring
145 Negative pressure generation mechanism
151, 152, 153 Fluid guide groove portion (deep groove)
A Atmosphere
F Sealing target fluid

The invention claimed is:

1. A sliding component formed in an annular shape and disposed at a relatively rotating position of a rotating machine and sliding relative to other sliding component, the sliding component comprising:
   a sliding surface of the sliding component provided with a shallow groove extending in a circumferential direction and generating a negative pressure and a deep groove collecting a sealing target fluid in the shallow groove and deeper than the shallow groove, and
   wherein the shallow groove has a terminating end portion in which a cross-sectional area of a flow path thereof becomes narrow toward the deep groove, and
   the terminating end portion of the shallow groove becomes gradually shallow toward the deep groove.

2. The sliding component according to claim 1,
   wherein a bottom surface of the terminating end portion of the shallow groove is curved to be depressed toward the deep groove.

3. The sliding component according to claim 2,
   wherein the deep groove communicates with a side of the sealing target fluid.

4. The sliding component according to claim 2,
   wherein the terminal end portion of the shallow groove is continuous to the deep groove in the circumferential direction, and
   the shallow groove further has a starting end portion continuous to the deep groove in the circumferential direction.

5. The sliding component according to claim 2,
   wherein the shallow groove and the deep groove are equiangularly disposed in the circumferential direction of the sliding surface of the sliding component and the shallow groove is formed in a symmetrical shape with respect to a line passing through the deep groove and extending in a radial direction.

6. The sliding component according to claim 1,
   wherein the deep groove communicates with a side of the sealing target fluid.

7. The sliding component according to claim 6,
   wherein the terminal end portion of the shallow groove is continuous to the deep groove in the circumferential direction, and
   the shallow groove further has a starting end portion continuous to the deep groove in the circumferential direction.

8. The sliding component according to claim 6,
   wherein the shallow groove and the deep groove are equiangularly disposed in the circumferential direction of the sliding surface of the sliding component and the shallow groove is formed in a symmetrical shape with respect to a line passing through the deep groove and extending in a radial direction.

9. The sliding component according to claim 1,
   wherein the terminal end portion of the shallow groove is continuous to the deep groove in the circumferential direction, and
   the shallow groove further has a starting end portion continuous to the deep groove in the circumferential direction.

10. The sliding component according to claim 1,
    wherein the shallow groove and the deep groove are equiangularly disposed in the circumferential direction of the sliding surface of the sliding component and the shallow groove is formed in a symmetrical shape with respect to a line passing through the deep groove and extending in a radial direction.

11. A sliding component formed in an annular shape and disposed at a relatively rotating position of a rotating machine and sliding relative to other sliding component, the sliding component comprising:
    a sliding surface of the sliding component provided with a shallow groove extending in a circumferential direction and generating a negative pressure and a deep groove collecting a sealing target fluid in the shallow groove and deeper than the shallow groove, and
    wherein the shallow groove has a terminating end portion in which a cross-sectional area of a flow path thereof becomes narrow toward the deep groove,
    the terminal end portion of the shallow groove is continuous to the deep groove in the circumferential direction, and
    the shallow groove further has a starting end portion continuous to the deep groove in the circumferential direction.

12. The sliding component according to claim 11,
    wherein a bottom surface of the terminating end portion of the shallow groove is curved to be depressed toward the deep groove.

13. The sliding component according to claim 11,
    wherein the deep groove communicates with a side of the sealing target fluid.

14. A sliding component formed in an annular shape and disposed at a relatively rotating position of a rotating machine and sliding relative to other sliding component, the sliding component comprising:
    a sliding surface of the sliding component provided with a shallow groove extending in a circumferential direction and generating a negative pressure and a deep groove collecting a sealing target fluid in the shallow groove and deeper than the shallow groove, and
    wherein the shallow groove has a terminating end portion in which a cross-sectional area of a flow path thereof becomes narrow toward the deep groove, and
    the terminating end portion of the shallow groove becomes gradually narrow in radial width toward the deep groove.

15. The sliding component according to claim 14,
    wherein a bottom surface of the terminating end portion of the shallow groove is curved to be depressed toward the deep groove.

16. The sliding component according to claim 14,
    wherein the deep groove communicates with a side of the sealing target fluid.

17. The sliding component according to claim 14,
    wherein the terminal end portion of the shallow groove is continuous to the deep groove in the circumferential direction, and
    the shallow groove further has a starting end portion continuous to the deep groove in the circumferential direction.

18. The sliding component according to claim 14,
    wherein the shallow groove and the deep groove are equiangularly disposed in the circumferential direction of the sliding surface of the sliding component and the shallow groove is formed in a symmetrical shape with respect to a line passing through the deep groove and extending in a radial direction.

\* \* \* \* \*